June 2, 1931.　　　　R. H. UPSON　　　　1,807,946
AIRPLANE AND METHOD OF MAKING SAME
Filed June 16, 1928　　　4 Sheets-Sheet 2
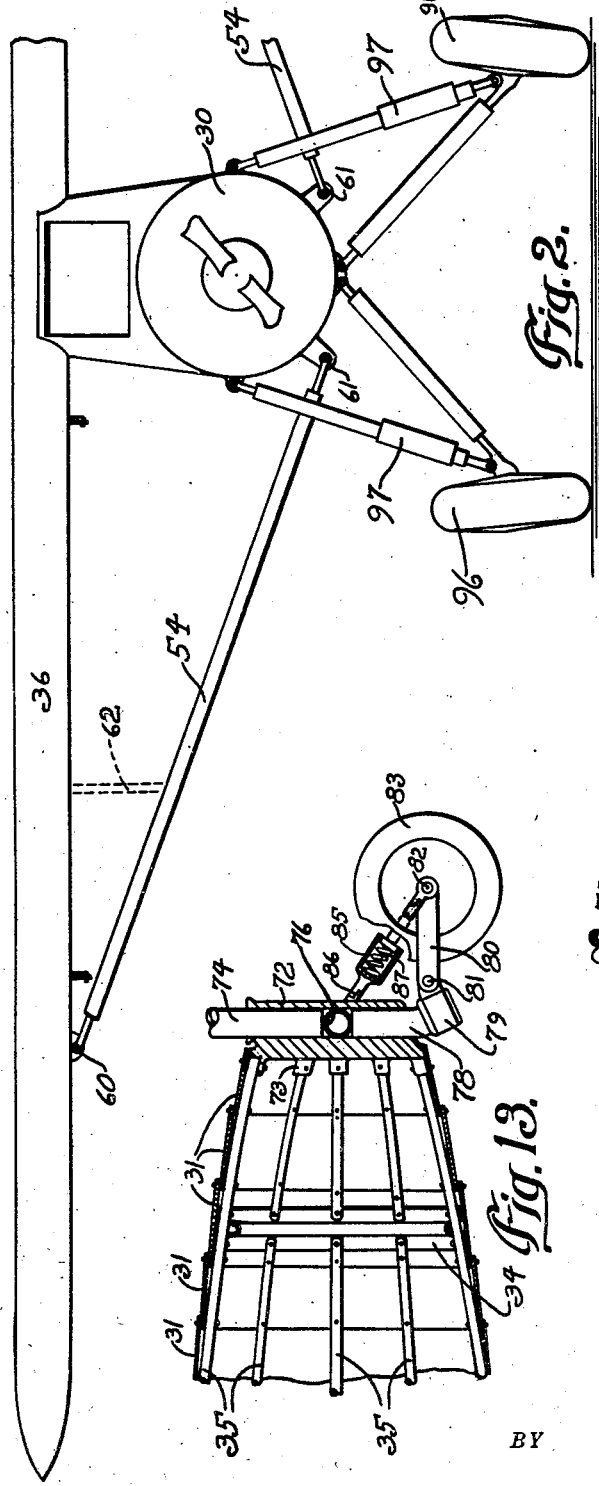
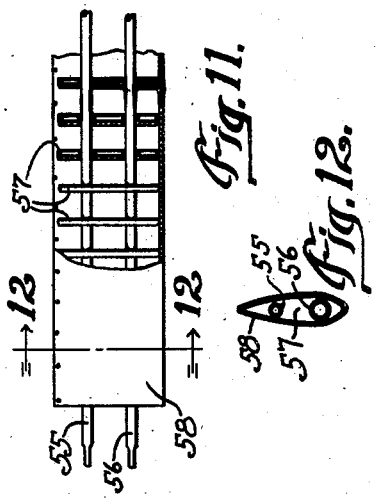
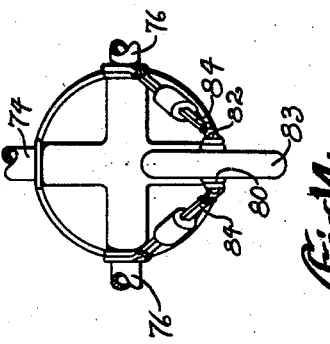
INVENTOR
RALPH H. UPSON.
BY
ATTORNEY

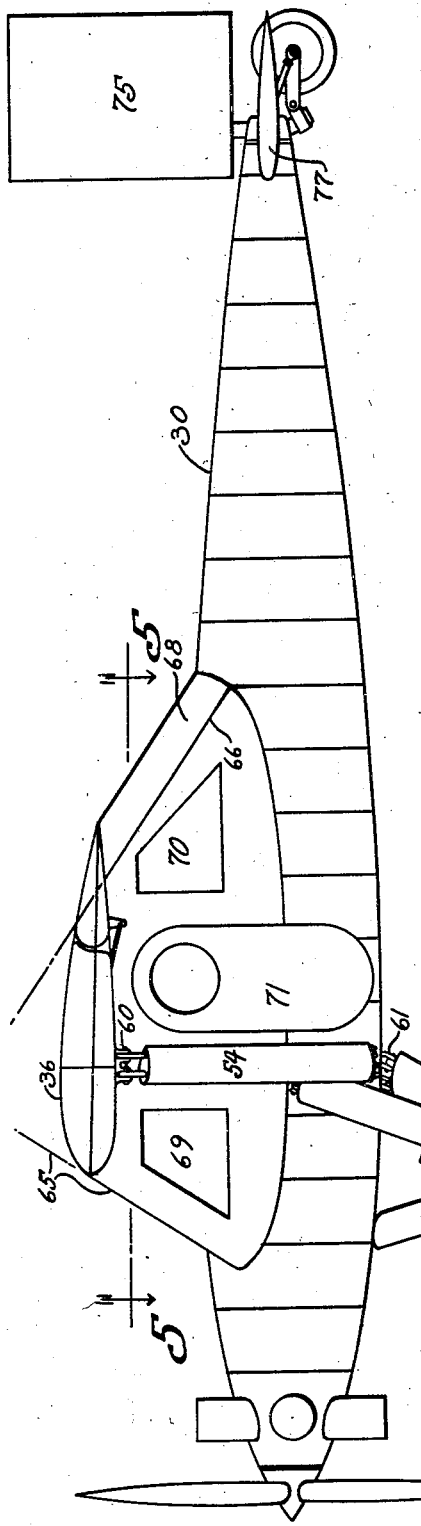
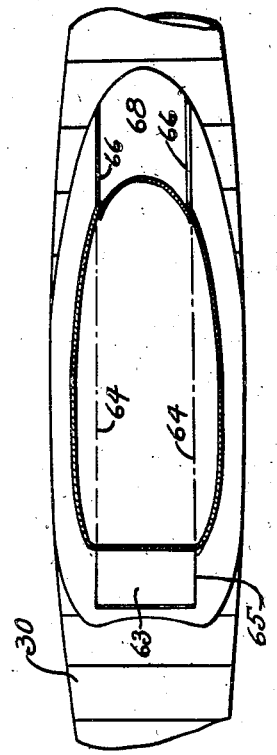
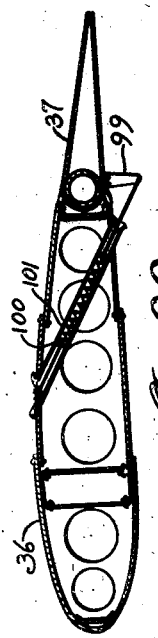
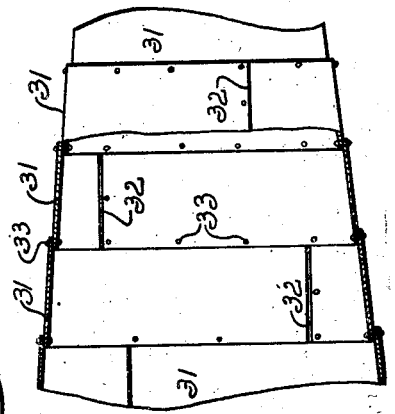

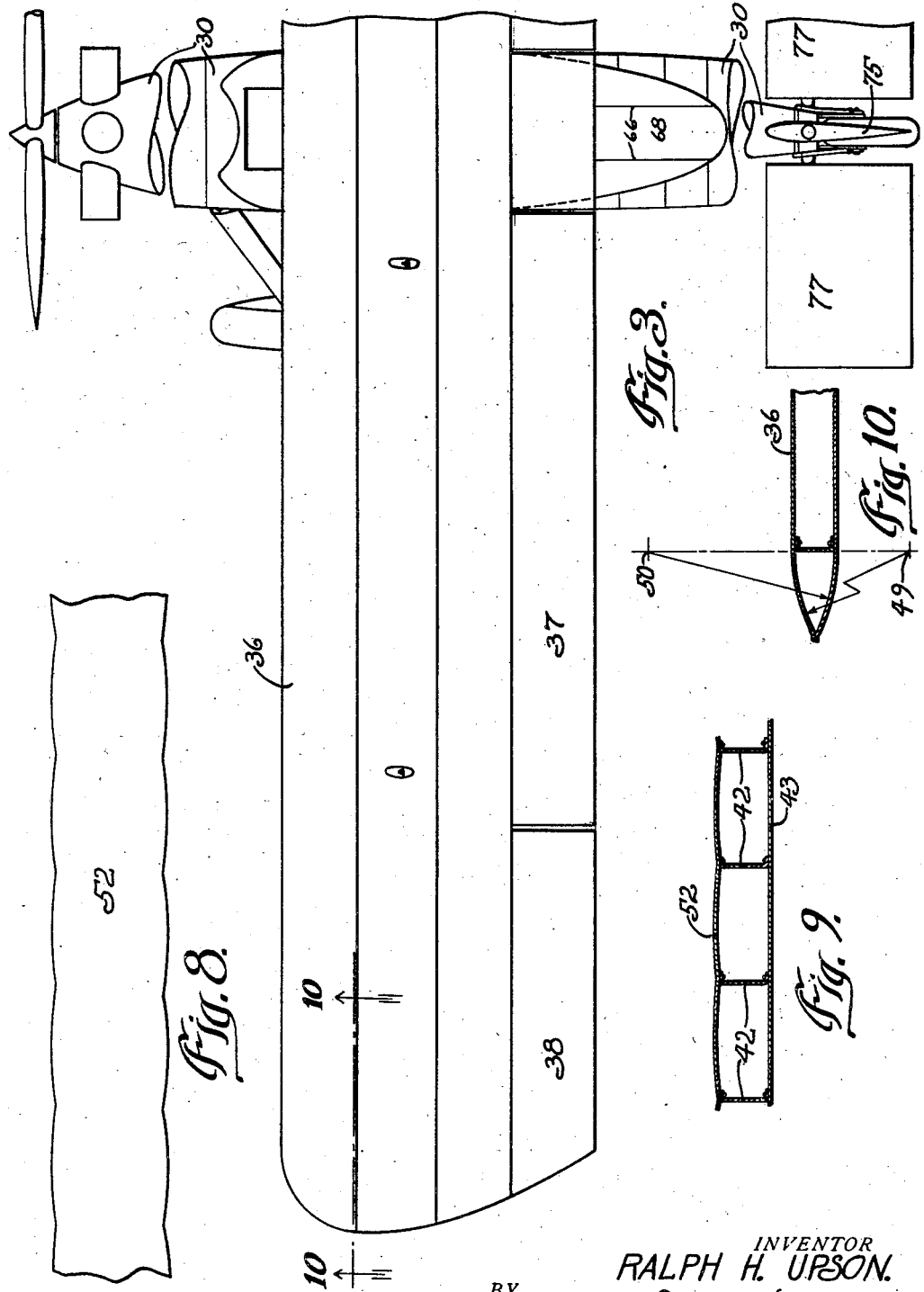

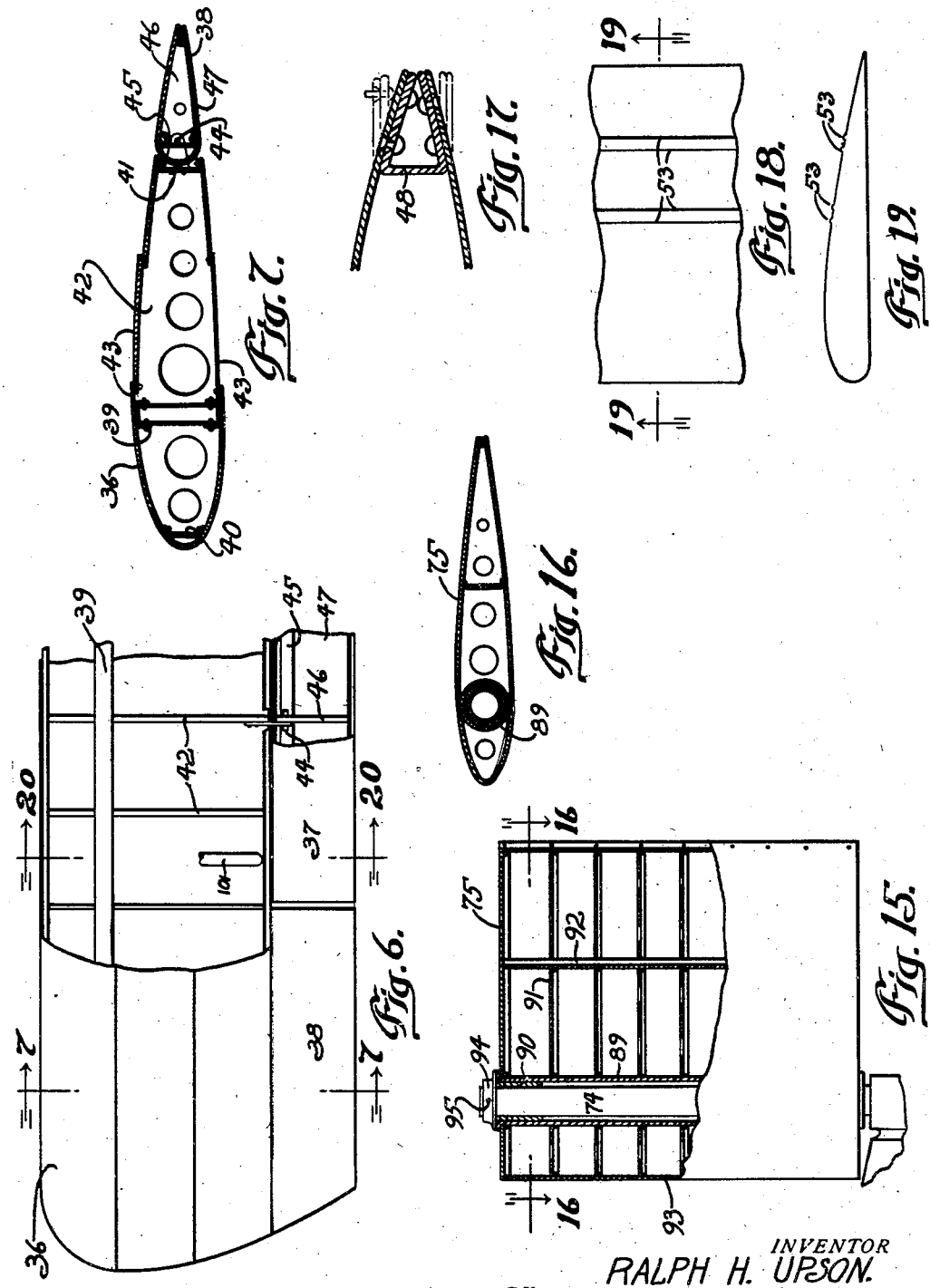

Patented June 2, 1931

1,807,946

UNITED STATES PATENT OFFICE

RALPH H. UPSON, OF DETROIT, MICHIGAN

AIRPLANE AND METHOD OF MAKING SAME

Application filed June 16, 1928. Serial No. 285,922.

This invention relates to airplanes and particularly to a new and novel construction therefor and method of making the same, the principal object being the provision of a so-called all-metal airplane that is simple in design, that is light but strong, and is economical to manufacture.

Another object is to provide an airplane in which the wings are covered with a plain sheet metal skin or covering arranged to act as stress transmitting means.

Another object is to provide an airplane in which the fuselage is provided with a metal skin formed of a plurality of frusto-conical sections suitably secured together.

Another object is to provide an airplane wing, the external surface of which is formed of strips of sheet metal extending lengthwise of the wing and suitably secured together.

Another object is to provide an airplane wing in which the external surface thereof is initially formed so as to transmit the lifting effort thereon to the ribs with a minimum of strain on the surface.

Another object is to provide a novel means for securing a metal skin covering for an airplane wing in place at the trailing edge of the wing.

Another object is to provide a simple form of cabin construction for an airplane.

Another object is to provide an airplane wing provided with a single spar for transmitting the lifting effort on the wing through the same to the fuselage.

Another object is to provide an airplane in which each wing is provided with but a single external strut.

Another object is to provide a novel form of strut for airplanes, formed wholly from metal.

Another object is to provide a novel form of wing end or tip construction.

Another object is to provide a new and novel tail support for an airplane.

Another object is to provide an airplane in which there will be a minimum loss of power due to any departure of the air from a theoretical symmetrical flow about the same.

Another object is to provide an airplane in which no fixed airfoil surfaces or stabilizers are provided at the rear end of the fuselage.

Another object is to provide wing flaps which are automatically controlled to maintain the center of pressure of the wing within predetermined limits between the leading and trailing edges thereof, and also to bring the flaps down for conditions of low speed and high incidence, thereby automatically increasing the lift coefficient for such conditions.

A further object is to provide a method for forming certain parts of an airplane, as hereinafter described.

The above being among the objects of the present invention, the same consists in certain features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views,—

Fig. 1 is a more or less diagrammatic side elevation of an airplane constructed in accordance with the present invention.

Fig. 2 is a fragmentary front elevation of the airplane shown in Fig. 1.

Fig. 3 is a fragmentary plan view of the airplane shown in Figs. 1 and 2.

Fig. 4 is an enlarged fragmentary partially broken view of the skin or covering for the fuselage.

Fig. 5 is a sectional view of the cabin taken as on the line 5—5 of Fig. 1.

Fig. 6 is an enlarged fragmentary partially broken plan view of one of the wings.

Fig. 7 is a sectional view of one of the wings taken as on the line 7—7 of Fig. 6.

Fig. 8 is a plan view of one of the sheet metal strips employed in making a modified form of cover for the upper portion of the airplane wing.

Fig. 9 is a fragmentary vertical sectional view taken transversely longitudinally through the length of the airplane wing.

Fig. 10 is a sectional view taken as on the line 10—10 of Fig. 3, illustrating the manner of forming the wing tip.

Fig. 11 is an enlarged fragmentary partially broken view of one of the wing struts.

Fig. 12 is a sectional view taken on the line 12—12 of Fig. 11.

Fig. 13 is an enlarged fragmentary vertical sectional view taken through the rear end of the fuselage to illustrate the construction of the same.

Fig. 14 is a view taken from the rear end of the fuselage to show the rudder and elevator supports and the supporting means for the rear end of the fuselage.

Fig. 15 is an enlarged partially broken side view of the rudder.

Fig. 16 is a sectional view taken as on the line 16—16 of Fig. 15.

Fig. 17 is an enlarged fragmentary vertical sectional view taken as through the rear edge of the wing aileron, or a flap, and illustrating the method of forming the same.

Fig. 18 is a fragmentary plan view of a wing showing a modified form of covering therefor.

Fig. 19 is a more or less diagrammatic sectional view taken on the line 19—19 of Fig. 18.

Fig. 20 is a sectional view taken on the line 20—20 of Fig. 6.

In airplane construction it is desirable, because of the deterioration which fabric covering is subjected to due to the elements, to employ a metal covering. The chief disadvantage of metal covering at the present time is the increase in weight and cost thereof over the conventional fabric covering. The weight has been minimized to some extent in some constructions by utilizing the metal covering as a stress transmitting member. The usual mode of accomplishing this is to corrugate or rib the covering parallel with the direction of movement, thus imparting strength to the wing in that direction, which permits the use of a lesser number of ribs, but such corrugated or ribbed construction of the covering does not aid in increasing the strength of the wing along the length thereof or at an appreciable angle to the corrugations or ribs. By the proper use of a smooth metal covering as a stress transmitting member, as set out in the present invention, the ultimate strength of an airplane may be greatly increased, and at the same time permit a decrease in the ultimate weight of a metal covered construction. The present invention provides for certain novel features of construction, designed to utilize most fully the possibilities for saving of weight and cost, and other improvements directly or indirectly inherent in the use of an essentially smooth metal skin.

The same principles of stressed skin or covering may be applied to the fuselage of an airplane, and the present invention provides means whereby such construction may be utilized to the best advantage.

The present invention also provides a cabin for such an airplane of simple and easily fabricated construction.

In most airplanes, as heretofore constructed, whether of the metal or composite construction, they have been built in such a manner that air currents acting on them at an angle to their designed direction of movement cause an unnecessary drag on the airplane which has the effect of cutting down the otherwise available speed. One of the reasons for this is that the surface of the fuselage is constructed with one or more flat surfaces which offer a material obstruction to the flow of air against the same, and another reason is the use of fixed stabilizing surfaces at the rear end of the fuselage which, particularly in conjunction with the use of the movable control surfaces causes a drag which is often out of proper proportion to the actual control force exerted.

In the present invention I provide a means whereby the fuselage or parts thereof may be made perfectly round whereby no flat surfaces are apparent against which the air may act, and I further prefer to eliminate the use of stabilizers whereby the ill-effects thereof are eliminated. Although the latter feature may be applied to any airplane, it is most effective and desirable on one with a smooth rounded skin in accordance with the present invention.

In accordance with the present invention I show in the accompanying drawings an airplane having a fuselage 30 provided with a skin or covering which is made up of a plurality of frusto-conical sheet metal sections 31. As best illustrated in Fig. 4, the fuselage is circular in section and increases from a minimum diameter at the rear end to a maximum diameter in the neighborhood of the cabin and then again decreases towards the forward end thereof. The sections 31 may be made from a sheet of metal and laid out previous to assembly in the same manner that any cone is laid on a flat sheet of material. The free edge portions are brought together as at 32 and suitably secured together and the sections 31 may be secured to each other to form the completed skin structure by rivets such as 33. The sections 31 may be built up on a framework such as the metallic ribbed members 34 and longitudinally extending members 35, as illustrated in Fig. 13, to which they are suitably secured by rivets or other suitable means, so as to increase the strength thereof by serving as stress transmitting means and an integral part of such framework.

I prefer to form substantially the entire rear edge of the wings 36 as flaps 37 and ailerons 38, although it will be apparent that a single flap may be formed on each wing instead of both a flap and an aileron, and suitable means be provided for controlling them in order to accomplish the same results obtainable by the use of both.

As illustrated in Figs. 6 and 7, I form the framework for the wings 36 with a single main spar 39, suitable nose-stiffening members such as 40 and a structural member 41 at the rear edge, together with a suitable number of ribs 42 extending therebetween.

I prefer to form the skin or covering for the wings 36, as illustrated in Figs. 6 and 7, by providing a plurality of sheet metal strips 43 extending lengthwise of the wings with their adjacent edges overlapping and secured together in any suitable manner, the strips 43 being formed of perfectly plain sheet metal strips. The flaps 37 and ailerons 38 may be formed as indicated in Fig. 7, in which they are shown as comprising lengthwise extending main members 45, a plurality of ribs 46 and plain sheet metal covering 47, and suitably supported to pivot about the axis of the pins 44. The rear edge of the flaps 37 and ailerons 38, and wings 36 at those points thereon not provided with flaps or ailerons, may be formed as indicated in Fig. 17. As illustrated in that figure, a sheet metal member 48 originally U-shaped in section, as illustrated by the dotted lines in that figure, is secured to the rear ends of the ribs between the respective rear edges of the upper and lower coverings, and such coverings are riveted or otherwise secured to the side portions thereof, after which the free edges of the member 48 are bent into contact or substantially contacting relationship, as shown. If desired, rivets extending through both the upper and lower covering and through both legs of the V-shaped member may be employed as an alternative to or additional to the means shown for securing the covering in place at its rear edge.

I prefer to form the ends or tips of the wings and ailerons as illustrated in Fig. 10. As illustrated in that figure, the upper surface of the wing end is formed as a surface of revolution having its axis as at 49, and the lower surface formed as a surface of revolution having its axis as at 50, the axes 49 and 50 being straight lines below and above the surface of the wing respectively, and preferably parallel to the mean chord of the wing section. By this construction I am enabled to initially form the strips 43 for the wing covering so that when they are secured together, as indicated, they will form a strong and smooth end surface.

In practice the metal on the upper surface of the wing is slightly stretched between the ribs by the suction acting above the same in transmitting the lifting forces thereon to the various ribs. This is of advantage because of the fact that in stretching, it allows the skin to bellow upwards and thereby reduces the stresses therein in transmitting such lifting effort to the ribs. This same effect may be exaggerated by forming the lengthwise extending sheets for the wing covering as indicated at 52 in Fig. 8. As shown in that figure, the edges of the sheet 52 are initially slightly scalloped, the distance between each scallop corresponding with the spacing of the ribs of the wings. Due to these scalloped edges and due to the aerofoil curvature of the wings, when strips such as 52 are provided for the upper wing surface and the scalloped edges of the adjacent strips 52 secured together, as before explained, the result will be that the upper skin of the wing will be bellowed upwardly between each rib 42, as illustrated in Fig. 9, and will thus lessen the stresses to which the upper wing covering is subjected to in transmitting the lifting forces acting thereon to the various ribs 42.

A similar result may be accomplished by forming one or more relatively shallow corrugations such as 53, as illustrated in Figs. 18 and 19, extending longitudinally of the wing so that the covering may give slightly across the wing to permit it to bellow longitudinally of the wing by its natural elastic stretch. The lower covering or skin may be similarly formed if desired, as is readily apparent. These lower bellows may be downward instead of upward if internal pressure in the wing is utilized as described in my co-pending application filed on even date. It is clear that if the direction of the bellows is to be against the designed curvature of the skin at any point, the initial scallops, if used, must be concave instead of convex.

Due to the use of the metallic skin or covering formed as a stress transmitting member, as described, I am enabled to employ only one main spar 39 as described, because the skin in transmitting the stresses from rib to rib and from end to end of the wing on the surface thereof, imparts great structural rigidity to the wings which prevents twisting or deformation of the same to a greater extent than is possible in the conventional fabric covered constructions provided with a plurality of spars and relatively great number of ribs. This also permits me to employ but a single strut 54 for each wing, each strut preferably extending from a point substantially midway the length of each wing to a point on the fuselage adjacent the bottom thereof, and serving only to help transmit the lift on the wings to the fuselage. It is to be noted that in conventional externally braced constructions at least two separate struts are employed on each side so as to prevent twisting of the end of the wing relative to the fuselage, this being necessary because of the lack of torsional rigidity of the wing construction itself which is overcome by the present construction as described. The principles of the present construction in this respect may be likened to an I-beam. Considering the flanges of the I-beam as the skin or covering, and the web as the internal framework or bracing, it will be seen that in fabric or corrugated metal covered airplane constructions the framework carries practically all the load and the skin practically none, while by the present construction the skin is made to serve as active stress or force transmitting means like the flanges of an I-beam whereby the moment of inertia of the sections may be increased and at the same time allow a decrease in weight of the framework.

I prefer to form the struts 54, as illustrated in Figs. 11 and 12 respectively. As shown in those figures, each strut is formed of a pair of tubular metal members 55 and 56 over which may be threaded a plurality of spaced metallic rib members 57 and the whole covered by a suitable plain sheet metal covering 58. The ends of the tubular members 55 and 56 may be pivotally secured to the wings 36 as at 60 and to the fuselage as at 61, the points of connection to the wings and fuselage being maintained in spaced relationship, as indicated in Fig. 1. This type of strut is obviously much stiffer in the direction of movement of the airplane and consequently most liable to buckle in a direction transverse thereto, and therefore supplementary stiffening struts 62, as shown by dotted lines in Fig. 2, may be used to advantage.

In accordance with the present invention I provide a novel form of cabin construction. As illustrated best in Figs. 1 and 5, the cabin is formed of sheet metal so that its surfaces are single curved only. The forward face of the cabin is provided with a windshield 63 of less width than the maximum width of the cabin, and the side surfaces of the cabin extending from the windshield 63 or windshield edge line 65 to a line such as 66 at the rear are each formed as surfaces of a cone having its apex at the intersection of the lines 65 and 66 and in a vertical plane passing through a line such as 64, on the corresponding side of the cabin, and indicated in Fig. 5, the lines 64 being spaced an amount preferably commensurate with the width of the windshield 63. Thus such side surfaces may be laid out on a flat sheet of metal and readily bent to the shape indicated. The rear surface 68 of the cabin may be formed as a part of a cylindrical surface. Thus any of the portion of the cabin may be formed from flat sheet metal without any drawing operations whatsoever upon the same. This construction, which is in accordance with the construction principles of the covering for the fuselage and wings, aids in producing a construction which is very economical to manufacture, and at the same time is unusually light and strong. The cabin may, of course, be provided with windows such as 69 and 70 and doors 71.

Instead of providing the usual form of tail skid, I prefer to provide in the present case a construction as indicated best in Figs. 13 and 14. The rear end of the fuselage is preferably formed of a cast or other member 72 having formed on the forward face thereof sockets 73 for the reception and retention of the longitudinally extending fuselage members 35. The member 72 is formed to support therein a vertically extending tubular post 74 for the rudder 75 and two laterally extending tubular posts 76 for the elevators 77. Secured in and extending downwardly from the member 72 is a tubular post member 78, the lower end of which is bent rearwardly so that its axis is perpendicular to the ground when the airplane is at rest upon the ground. The lower end of the post member 78 is provided with a rotatable collar 79 to which a pair of link members 80 are pivotally secured as at 81. The rear ends of the links 80 are secured to the axle 82 for the wheel 83. A link 84 secured to each side of the axle 82 for universal movement extends upwardly and outwardly therefrom and is slidably received in the enlarged end 85 of a corresponding link 86 which is mounted for universal movement on the corresponding elevator posts 76. Shock absorbing means 87 positioned within the enlarged ends 85 are adapted to transmit the weight of the rear end of the airplane to the wheel 83, the means 87 acting to cushion the transmission of such weight and the forces due thereto.

The rudder 75 and elevators 77 are of substantially the same general construction, and the construction of the rudder 75 will therefore be described as typical of the construction of both. As illustrated in Figs. 15 and 16 the rudder 75 is provided with a main tubular member 89 provided with internal bearings 90 which are adapted to rotatably receive the rudder post 74. A plurality of ribs 91 are threaded on and secured to the member 89 in suitable spaced relationship, and one or more structural tie members 92 may be provided, if desired. The ribs 91 are provided with a metal skin or covering 93 in much the same manner as the wings and ailerons previously described. The rudder may be secured against movement axially of the post 74 by means of a collar 94 pinned to the post 74 by a pin such as 95.

The fuselage may, of course, be provided with wheels such as 96 connected to the fuselage through shock absorbing mechanisms such as 97 of any conventional type, as will be readily apparent.

The smooth skin construction especially lends itself to the use of leading edge slots, preferably of the automatic type such as described in my co-pending application filed on even date. To co-operate with such slots or as a substitute for them, at the same time preventing an abnormal inclination of the fuselage, I propose to use trailing edge flaps, preferably automatic as shown in Fig. 20.

The action is on the principle of the old flexible trailing edge but has certain novel features of detail. As illustrated in that figure the flap 37 is pivoted to swing about the center of the tube 98. The flap 37 has depending therefrom a bracket 99. A coil spring 100 connected to the end of the bracket 99 extends upwardly through the wing 36 and is anchored adjacent the upper surface thereof. In the embodiment shown the spring is surrounded by a tube 101 sealed against leakage to the upper and lower covering of the wing so that in event the interior of the wing is maintained under pressure, no leakage will occur because of the passage of the spring through it. The spring 100 is maintained under tension so that it has a natural tendency to rotate the flap 37 in a clockwise direction, as viewed in Fig. 20, this tendency being resisted in flight by the air pressure acting on the flap, and is preferably such that during normal flight the spring maintains the flap in a horizontal position as shown. However, as the wing approaches the angle of stall with decreasing speed and the center of air pressure on the wing tends to approach the leading edge, the drop in pressure acting on the flap will allow the spring 100 to move the flap in a clockwise direction, as viewed in Fig. 20, so as to increase its angular relation with respect to the direction of movement, and thereby increases the effective angle of incidence of the entire wing section including the flap. This causes an increase of the lift coefficient of the wing as a whole, and acts to prevent the center of pressure on the wing from moving any further towards the leading edge. Obviously, as the airplane straightens out the pressure will increase on the flap and will cause the flap to move back towards its normal position.

In practice it may be found desirable to connect the flap on one side of the fuselage with the flap on the other side of the fuselage so that they will turn together, and this may be readily accomplished by running the tube 98 between such flaps and securing the flaps for equal rotation with the tube, the tube of course being rotatably supported from the wing.

The particular spring control arrangement for the flaps may obviously be varied from that shown. The spring may be entirely external to the wing, if desired, or a cable attached to the bracket 99 for each flap may be run over sheaves (not shown) and into the interior of the fuselage where suitable adjusting and controlling means, in conjunction with spring means, may be provided.

The use of the spring control shown is, of course, not essential in connection with the flaps 37. It may, for instance, be found satisfactory to connect the flaps 37 to the elevators 77 by suitable linkages so that when the elevators are raised when the speed is reduced the flaps will be simultaneously depressed, thereby effecting an increase in the angle of incidence and lift coefficient of the wings.

It will be obvious from the above description that I have provided an efficient all-metal airplane structure, and that by the use of the metal skin panels formed and secured as described a substantially continuous and unbroken curvature of the fuselage and wings is obtained, together with other features coordinating therewith, by which I am enabled to obtain a structure of maximum efficiency and minimum weight and cost.

Formal changes may be made in the specific embodiment of the invention described without departing from the spirit or substance of the broad invention, the scope of which is commensurate with the appended claims.

What I claim is:

1. A strut for an airplane comprising a pair of tubular metal members, a plurality of peripherally flanged sheet metal ribs threaded thereon, and a sheet metal skin extending over said ribs.

2. An airplane wing comprising, in combination, an internal framework and an upper and a lower sheet metal covering for said framework, said covering at the tip of said wing being formed as surfaces of revolution and secured together at their points of contact.

3. The method of securing sheet metal covering for an airfoil section at the trailing edge thereof, comprising inserting between the upper and lower covering at the trailing edge a channel-shaped member, securing the rear end of the ribs to the front face of said channel and securing the upper and lower covering to the legs of said channel, and bending the free edges of said channel into substantially contacting relationship.

4. An airplane wing comprising, in combination, an internal framework including a plurality of transversely disposed ribs spaced from each other longitudinally of said wing, and a covering for said framework formed from smooth sheet metal strips extending longitudinally of said wing and rigidly secured together at their margins and secured to said ribs, said strips having their front and rear edges scalloped before assembly whereby upon securement to each other and to said ribs said covering is bellowed between each of said ribs.

5. In an airplane wing, in combination, an upper and a lower sheet metal covering therefor having separate edges at the trailing edge of said wing, a triangularly sectioned sheet metal member disposed lengthwise of said trailing edge between said separate edges, said member being longitudinally split along one apex of the triangle and said split apex constituting the most rearwardly disposed portion of said member relative to said wing, and said separate edges being secured to the sides of said member adjacent said split apex.

6. An airplane wing comprising, in combination in internal framework and a substantially smooth sheet metal skin, said skin being provided with one or more non-structural corrugations therein extending longitudinally of the wing at a distance rearwardly of the leading edge thereof where there is a normal balance of pressure acting outwardly on the skin.

7. An airplane wing comprising, in combination, an internal framework and a substantially smooth sheet metal skin, the skin on the upper surface of said wing being provided with one or more corrugations of a size insufficient for direct stiffening purposes whereby to permit said skin to stretch perimetrically of a transverse section through said wing under the influence of a pressure difference set up between opposite sides of said skin in flight.

8. In combination with an airplane wing having a substantially smooth sheet metal skin, means for allowing said skin to bellow between ribs during flight comprising a small amount of excess metal in said skin perimetrically of a transverse section through said wing.

9. The method of forming a thin sheet metal skin for an airplane wing to permit it to bellow during flight, comprising in introducing an excess length into said skin perimetrically of a transverse section of said wing.

10. In an airplane wing comprising rib elements, and enclosing skin formed of strips of metal extending lengthwise of said wing, the method of forming said skin to permit it to bellow between said elements comprising in introducing an excess of length into said skin perimetrically of a transverse section of said wing by scalloping the edges of said strips and securing the adjacent edges of said strips together with a substantially constant amount of overlap between them.

11. In an airplane, a thin substantially smooth metal skin stiffened by curved rib elements, the perimetrical length of said skin between said rib elements being slightly greater than the corresponding usual section perimeter of said wing, in order to permit said skin to bellow between said ribs.

12. An airplane wing, including ribs, having the upper skin thereof initially bellowed outwardly between the ribs.

13. An airplane wing including ribs and a substantially smooth structural skin, said skin on the upper side of said wing being initially bellowed outwardly between said ribs.

14. In an airplane wing, in combination, an upper and lower sheet metal covering therefor having separate edges at the trailing edge of said wing, a hollow sheet metal member disposed lengthwise of said trailing edge between said separate members, said member comprising a pair of forwardly divergent side portions connected together at their forward edges and substantially contacting with each other at their rear edges, said separate edges being secured to the corresponding of said side portions of said hollow member.

RALPH H. UPSON.